(12) United States Patent
Vanderwoude et al.

(10) Patent No.: US 7,179,076 B1
(45) Date of Patent: Feb. 20, 2007

(54) METHOD AND APPARATUS FOR MAKING ELEVATOR BUCKETS

(75) Inventors: Brig Vanderwoude, Milan, IL (US); Oliver Nicholas Anderson Braime, Tadcaster (GB)

(73) Assignee: 4B Elevator Components, Ltd., East Peoria, IL (US)

( * ) Notice: Subject to any disclaimer, the term of this patent is extended or adjusted under 35 U.S.C. 154(b) by 380 days.

(21) Appl. No.: 10/782,987

(22) Filed: Feb. 20, 2004

Related U.S. Application Data

(63) Continuation-in-part of application No. 29/196,048, filed on Dec. 22, 2003, now Pat. No. Des. 496,052.

(51) Int. Cl.
*B29C 45/10* (2006.01)
(52) U.S. Cl. ............................ 425/192 R; 425/542
(58) Field of Classification Search ........... 425/190, 425/192 R, 542; 249/102
See application file for complete search history.

(56) References Cited

U.S. PATENT DOCUMENTS

| | | | | |
|---|---|---|---|---|
| 3,564,660 A | * | 2/1971 | Darnell | 425/192 R |
| 5,262,116 A | * | 11/1993 | Von Holdt, Sr. | 264/297.2 |
| 2005/0266111 A1 | * | 12/2005 | Ciccone et al. | 425/192 R |

* cited by examiner

*Primary Examiner*—Donald Heckenberg
(74) *Attorney, Agent, or Firm*—Kajane McManus

(57) ABSTRACT

The method and apparatus for creating elevator buckets decreases the number of molds required to create a wide variety of dimensional configurations of such buckets by dividing the configurations into families, each of which has at least one dimension in common while each member of a family varies from other members thereof by at least one dimension, the method and apparatus being used to create all members of one family and enables changes to produce different bucket sizes within the same family without removing the mold base used in creating the family from the apparatus.

1 Claim, 5 Drawing Sheets

| Nominal Size | Family | Dimension (inches) | | | | | Standard Bolt Holes | | | | Capacity - (in3) | | | |
|---|---|---|---|---|---|---|---|---|---|---|---|---|---|---|
| | | Length | Projection | Front Depth | Back Depth | Thickness | No. of Holes | Bolt size | Hole Center | Dist. Down | Gross Capacity | Water Level | Useable Capacity | Min. Cup Spacing |
| 3 x 2 | 1 | 3-5/16 | 2-1/2 | 1-3/8 | 2-1/16 | 3/16 | 2 | 1/4 | 1-3/4 | 7/8 | 8 | 6 | 7 | 2-1/2 |
| 4 x 3 | 2 | 4-5/16 | 3-1/2 | 2-1/8 | 3-1/16 | 3/16 | 2 | 1/4 | 2-1/4 - 2-1/2 | 7/8 | 23 | 17 | 19 | 3-1/2 |
| 5 x 4 | 3 | 5-1/4 | 4-1/2 | 2-7/8 | 4-1/16 | 1/4 | 2 | 1/4 | 3-3/16 | 1-1/4 | 48 | 37 | 41 | 4-1/2 |
| 6 x 4 | 3 | 6-1/4 | 4-1/2 | 2-7/8 | 4-1/16 | 1/4 | 2 | 1/4 | 4-3/8 | 1-1/4 | 59 | 45 | 50 | 4-1/2 |
| 7 x 4 | 3 | 7-1/4 | 4-1/2 | 2-7/8 | 4-1/16 | 1/4 | 3 | 1/4 | 2-11/16 | 1-1/4 | 65 | 53 | 59 | 4-1/2 |
| 6 x 5 | 4 | 6-3/8 | 5-1/2 | 3-11/16 | 5-5/32 | 1/4 | 2 | 1/4 | 4-3/8 | 1-7/8 | 80 | 70 | 77 | 5-1/2 |
| 7 x 5 | 4 | 7-3/8 | 5-1/2 | 3-11/16 | 5-5/32 | 1/4 | 3 | 1/4 | 2-11/16 | 1-7/8 | 106 | 83 | 91 | 5-1/2 |
| 8 x 5 | 4 | 8-3/8 | 5-1/2 | 3-11/16 | 5-5/32 | 1/4 | 3 | 1/4 | 3-1/16 | 1-7/8 | 122 | 95 | 105 | 5-1/2 |
| 9 x 5 | 4 | 9-3/8 | 5-1/2 | 3-11/16 | 5-5/32 | 1/4 | 3 | 1/4 | 3-5/8 | 1-7/8 | 138 | 107 | 118 | 5-1/2 |
| 10 x 5 | 4 | 10-3/8 | 5-1/2 | 3-11/16 | 5-5/32 | 1/4 | 3 | 1/4 | 4-1/8 | 1-7/8 | 154 | 120 | 132 | 5-1/2 |
| 11 x 5 | 4 | 11-3/8 | 5-1/2 | 3-11/16 | 5-5/32 | 1/4 | 4 | 1/4 | 3 | 1-7/8 | 169 | 132 | 145 | 5-1/2 |
| 12 x 5 | 4 | 12-3/8 | 5-1/2 | 3-11/16 | 5-5/32 | 1/4 | 4 | 1/4 | 3-3/8 | 1-7/8 | 185 | 145 | 160 | 5-1/2 |
| 8 x 6 | 5 | 8-3/8 | 6-5/8 | 4-5/16 | 6-1/16 | 9/32 | 3 | 1/4 | 3-1/16 | 2 | 175 | 138 | 153 | 6-1/2 |
| 9 x 6 | 5 | 9-3/8 | 6-5/8 | 4-5/16 | 6-1/16 | 9/32 | 3 | 1/4 | 3-5/8 | 2 | 199 | 154 | 169 | 6-1/2 |
| 10 x 6 | 5 | 10-3/8 | 6-5/8 | 4-5/16 | 6-1/16 | 9/32 | 3 | 1/4 | 4-1/8 | 2 | 222 | 172 | 190 | 6-1/2 |
| 11 x 6 | 5 | 11-3/8 | 6-5/8 | 4-5/16 | 6-1/16 | 9/32 | 4 | 1/4 | 3 | 2 | 245 | 190 | 209 | 6-1/2 |
| 12 x 6 | 5 | 12-3/8 | 6-5/8 | 4-5/16 | 6-1/16 | 9/32 | 4 | 1/4 | 3-3/8 | 2 | 269 | 209 | 230 | 6-1/2 |
| 13 x 6 | 5 | 13-3/8 | 6-5/8 | 4-5/16 | 6-1/16 | 9/32 | 4 | 1/4 | 3-5/8 | 2 | 292 | 227 | 250 | 6-1/2 |
| 14 x 6 | 5 | 14-3/8 | 6-5/8 | 4-5/16 | 6-1/16 | 9/32 | 5 | 1/4 | 3 | 2 | 309 | 240 | 264 | 6-1/2 |
| 10 x 7 | 6 | 10-3/4 | 7-7/8 | 5 | 7-1/16 | 5/16 | 3 | 5/16 | 4-1/8 | 2 | 312 | 241 | 266 | 7-1/2 |
| 11 x 7 | 6 | 11-3/4 | 7-7/8 | 5 | 7-1/16 | 5/16 | 4 | 5/16 | 3 | 2 | 345 | 267 | 293 | 7-1/2 |
| 12 x 7 | 6 | 12-3/4 | 7-7/8 | 5 | 7-1/16 | 5/16 | 4 | 5/16 | 3-3/8 | 2 | 377 | 292 | 321 | 7-1/2 |
| 13 x 7 | 6 | 13-3/4 | 7-7/8 | 5 | 7-1/16 | 5/16 | 4 | 5/16 | 3-5/8 | 2 | 410 | 317 | 349 | 7-1/2 |
| 14 x 7 | 6 | 14-3/4 | 7-7/8 | 5 | 7-1/16 | 5/16 | 5 | 5/16 | 3 | 2 | 442 | 343 | 377 | 7-1/2 |
| 15 x 7 | 6 | 15-3/4 | 7-7/8 | 5 | 7-1/16 | 5/16 | 5 | 5/16 | 3-1/4 | 2 | 474 | 368 | 405 | 7-1/2 |
| 16 x 7 | 6 | 16-3/4 | 7-7/8 | 5 | 7-1/16 | 5/16 | 6 | 5/16 | 2-7/8 | 2 | 506 | 393 | 433 | 7-1/2 |
| 10 x 8 | 7 | 10-13/16 | 8-15/16 | 5-7/8 | 8-1/4 | 13/32 | 3 | 5/16 | 4-1/8 | 2-3/8 | 407 | 316 | 348 | 8-1/2 |
| 11 x 8 | 7 | 11-13/16 | 8-15/16 | 5-7/8 | 8-1/4 | 13/32 | 4 | 5/16 | 3 | 2-3/8 | 448 | 349 | 384 | 8-1/2 |
| 12 x 8 | 7 | 12-13/16 | 8-15/16 | 5-7/8 | 8-1/4 | 13/32 | 4 | 5/16 | 3-3/8 | 2-3/8 | 492 | 384 | 422 | 8-1/2 |
| 13 x 8 | 7 | 13-13/16 | 8-15/16 | 5-7/8 | 8-1/4 | 13/32 | 4 | 5/16 | 3-5/8 | 2-3/8 | 534 | 417 | 459 | 9-1/2 |
| 14 x 8 | 7 | 14-13/16 | 8-15/16 | 5-7/8 | 8-1/4 | 13/32 | 5 | 5/16 | 3 | 2-3/8 | 578 | 451 | 496 | 8-1/2 |
| 15 x 8 | 7 | 15-13/16 | 8-15/16 | 5-7/8 | 8-1/4 | 13/32 | 5 | 5/16 | 3-1/4 | 2-3/8 | 620 | 484 | 533 | 8-1/2 |
| 16 x 8 | 7 | 16-13/16 | 8-15/16 | 5-7/8 | 8-1/4 | 13/32 | 6 | 5/16 | 2-7/8 | 2-3/8 | 662 | 517 | 669 | 8-1/2 |
| 18 x 8 | 7 | 18-13/16 | 8-15/16 | 5-7/8 | 8-1/4 | 13/32 | 6 | 5/16 | 3-1/8 | 2-3/8 | 749 | 000 | 645 | 8-1/2 |
| 20 x 8 | 7 | 20-13/16 | 8-15/16 | 5-7/8 | 8-1/4 | 13/32 | 6 | 5/16 | 3-1/2 | 2-3/8 | 833 | 652 | 718 | 8-1/2 |

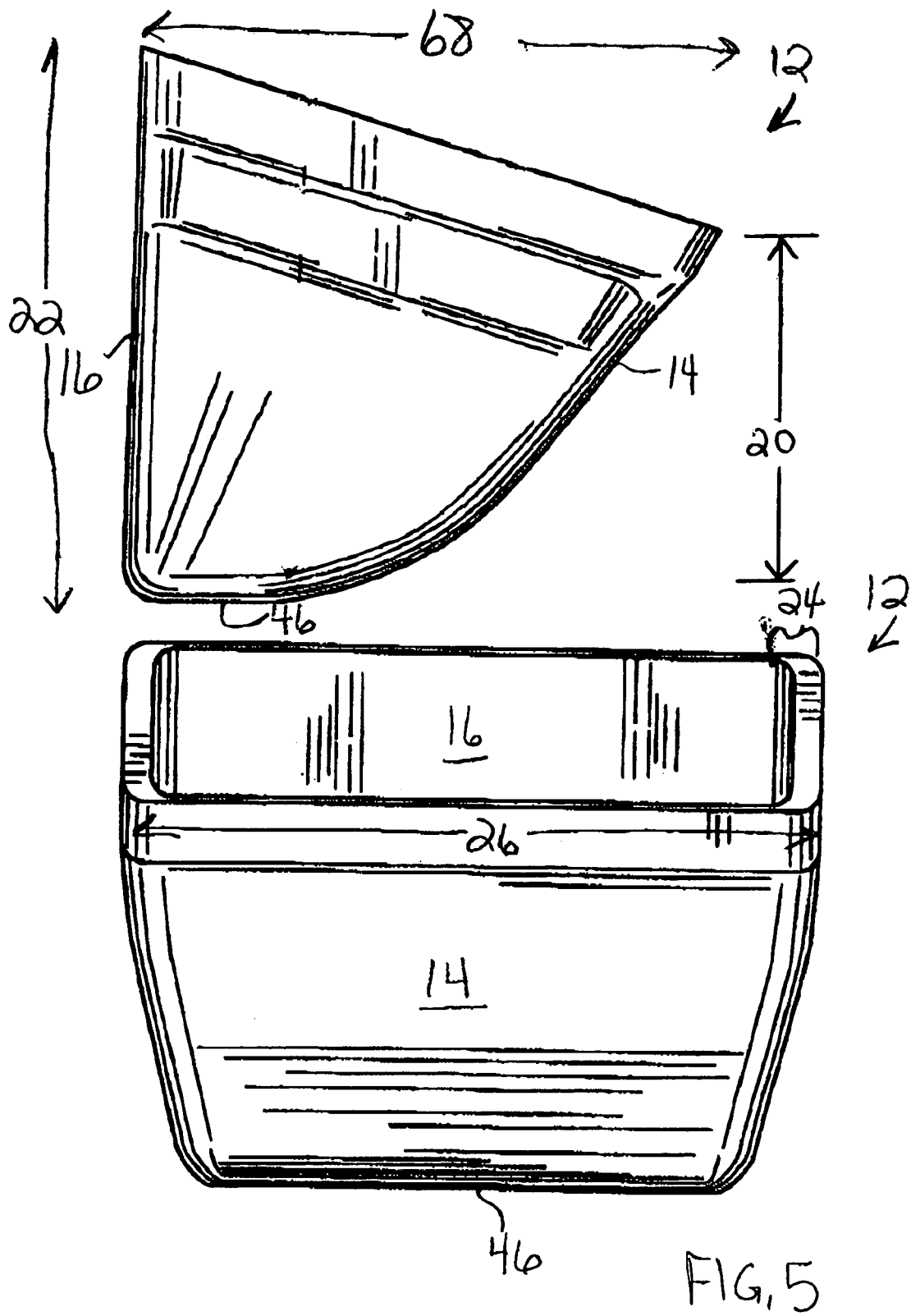

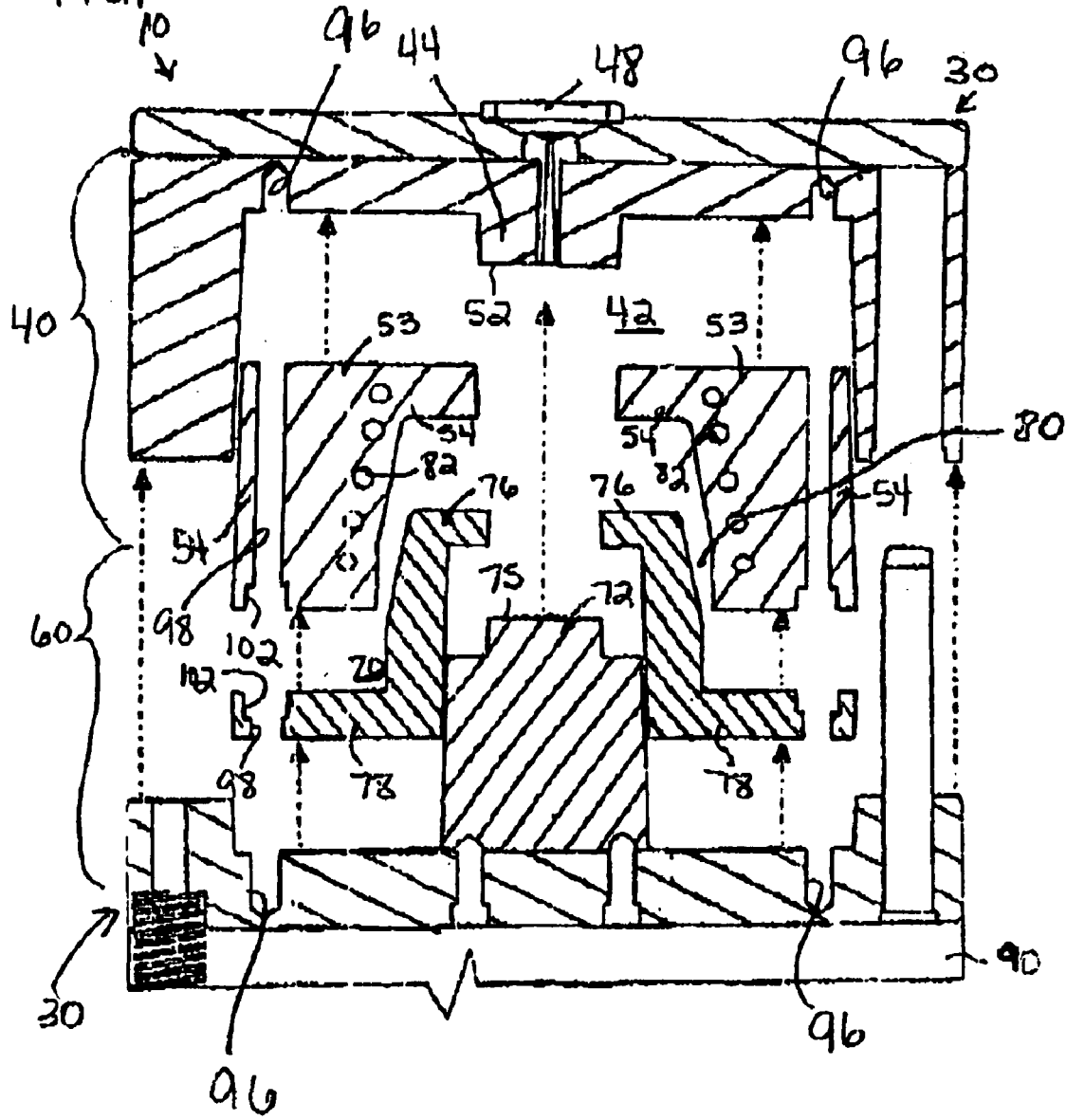

METHOD AND APPARATUS FOR MAKING ELEVATOR BUCKETS

CROSS REFERENCE TO RELATED APPLICATIONS

This application is a Continuation in Part of U.S. Application No. 29/196,048, filed Dec. 22, 2003, entitled Stackable Elevator Bucket, now U.S. Design Pat. No. D496,052.

BACKGROUND OF THE INVENTION

1. Field of the Invention

The present invention relates to a method and apparatus for making elevator buckets. More specifically, the method and apparatus create families of buckets having at least one dimension in common while having another dimension vary, the buckets belonging to one family being created with a single mold.

2. Prior Art

Heretofore methods and apparatus have been proposed for producing or creating elevator buckets of various sizes.

In one older embodiment, each dimensional configuration for such bucket has required its own mold. Thus, as an example, if there were thirty-five desired configurations, thirty-five individual molds, each at a cost of over $20,000, have been required.

As an example, such thirty-five desired configurations, using the method and apparatus of the invention could be created using only seven molds instead of thirty-five.

In another older embodiment, a family of buckets has been proposed to be created using a mold base wherein a center portion core has been replaceable to accommodate varying bucket length. This has required disassembling and reassembling of the apparatus for every dimensional change, such reconfiguring of the apparatus often producing apparatus downtime of many hours per reconfiguration.

As will be described in greater detail hereinafter, the method and apparatus of the present invention provide for ease in reconfiguration of a mold base without requiring complete disassembly and reassembly of the entire apparatus, and thus decreasing reconfiguration time significantly, decreasing cost and labor and inherently increasing productivity.

SUMMARY OF THE INVENTION

According to the invention there is provided an apparatus for use in creating a family of elevator bucket configurations, each family having at least one dimension in common; with each bucket configuration within each family having at least one dimension which varies from other bucket configurations within the family; the apparatus comprising a mold base having a bucket interior forming portion and a bucket exterior forming portion, the bucket exterior forming portion having a cavity therein configured to be larger than the largest desired bucket configuration within the family and having an outer core oriented therein which is configured to be smaller than the smallest desired bucket configuration within the family; the bucket interior forming portion having a cavity therein which is smaller than the cavity in the exterior forming portion and also having an inner core oriented therein which is configured to be smaller than the smallest desired bucket configuration within the family; the outer core having one surface which aligns with an opposing surface of the inner core but being spaced a predetermined distance therefrom; the apparatus further including a plurality of pairs of outer surface inserts with each pair of inserts engaging about the outer core and extending along a height of the core to define an exterior surface of a bucket of a desired dimensional configuration, each pair of outer surface inserts being of differing dimensions corresponding to a particular desired outer configuration for one bucket of the family; and a plurality of pairs of inner surface inserts with each pair of inserts engaging about the inner core and extending along a height of the core to define an interior surface of a bucket of desired dimensional configuration, each pair of inner surface inserts being of differing dimensions corresponding to a particular desired inner configuration for one bucket of the family, each inner surface insert having at least one surface which align with an opposing surface of a corresponding outer surface insert and being spaced a predetermined distance therefrom.

Further, according to the invention there is provided a method for creating any elevator bucket of a family of elevator bucket configurations, each family having at least one dimension in common; with each bucket configuration within each family having at least one dimension which varies from other bucket configurations within the family: the method comprising the steps of: selecting the desired dimensional configuration for an elevator bucket to be molded; determining the family to which the bucket belongs; selecting the mold base corresponding to the family to which the bucket belongs; selecting the appropriate inner and outer inserts necessary to produce the desired dimensional configuration for the bucket and placing same into the corresponding forming portion about the core thereof; bringing the forming portions together; injecting material from which the bucket is to be formed; allowing the material to cool; separating the forming portions; ejecting the formed bucket; and, if desired, creating another bucket by repeating the steps of the method.

BRIEF DESCRIPTION OF THE DRAWINGS

FIG. 3 is a table showing thirty-five exemplary dimensional configurations for a elevator bucket divided into 7 families as well as providing further characteristics for each bucket.

FIG. 4 is a side view of an exemplary bucket made with the method and apparatus of the present invention.

FIG. 5 is a perspective view of the bucket of FIG. 4.

FIG. 6 is an exploded perspective view of the apparatus

DESCRIPTION OF THE PREFERRED EMBODIMENT

Figure 1:
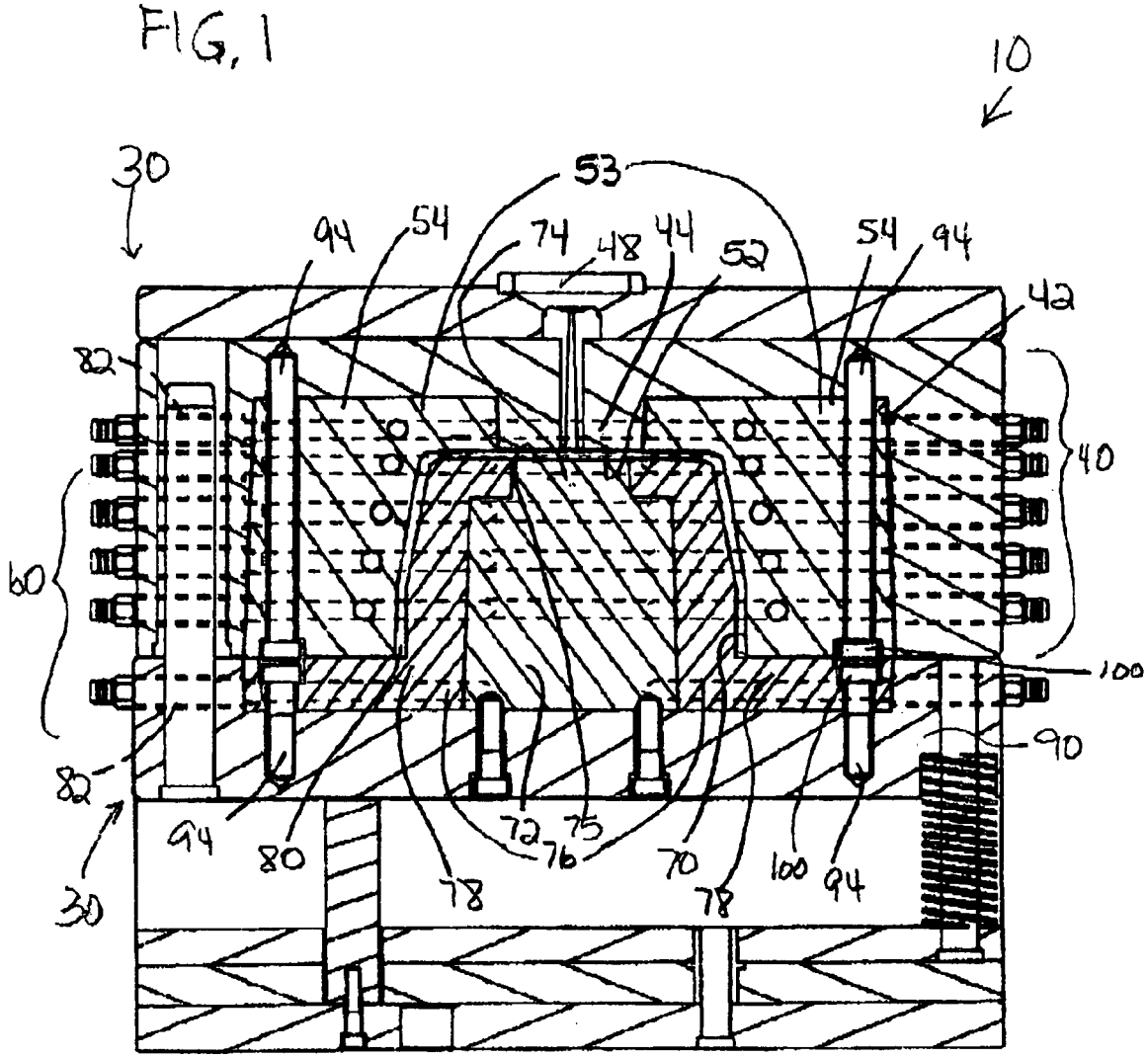
FIG. 1 is a lateral cross sectional view of the apparatus used with the method of the present invention
Figure 2:
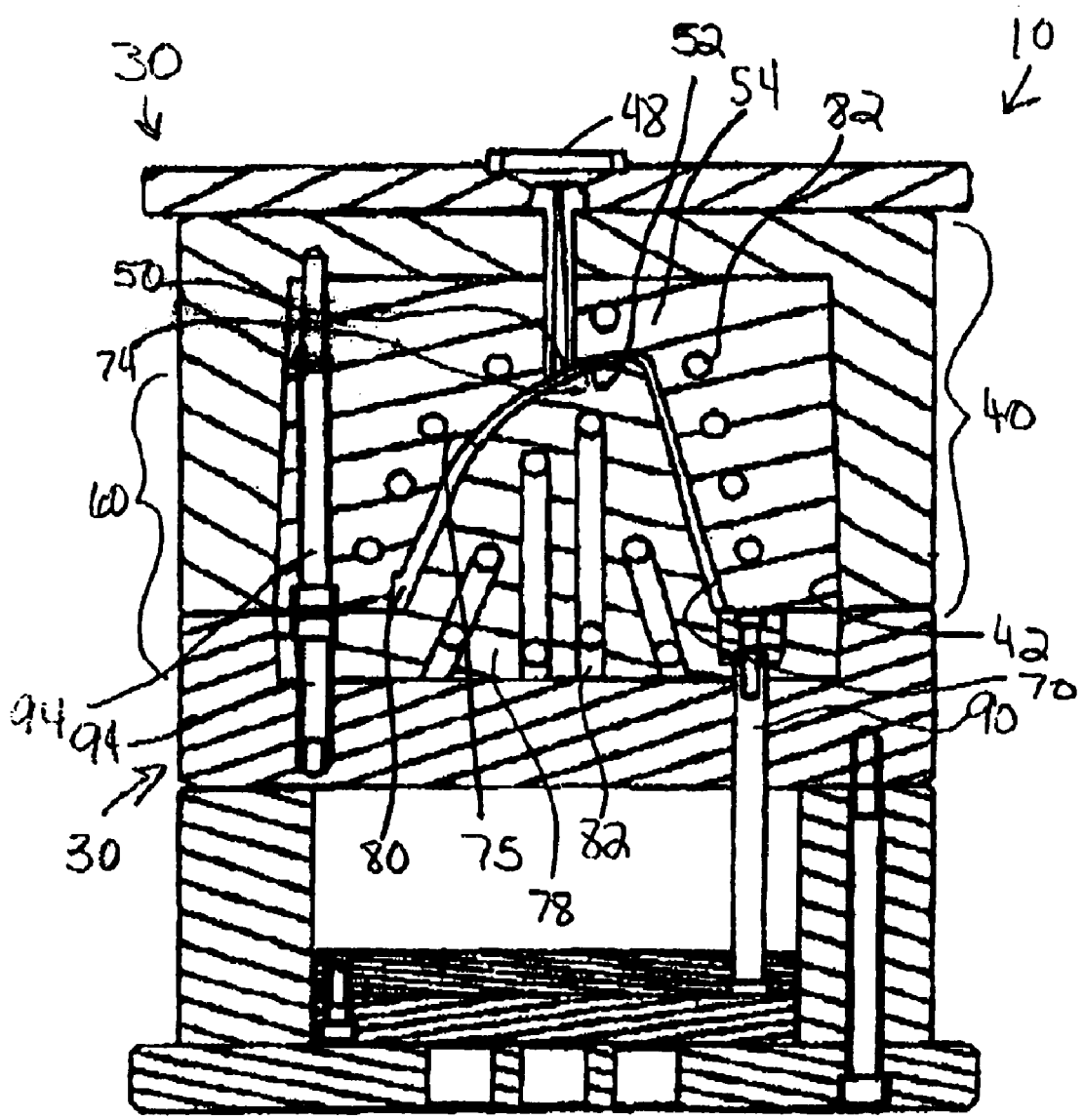
FIG. 2 is an end cross sectional view of the apparatus used with the method of the present invention

Referring now to the drawings in greater detail, there is illustrated therein one apparatus 10 used in creating one family 11 of elevator buckets 12.

Deferring to FIG. 3, it will be understood that each family 11 of elevator buckets 12 has at least one dimension in common. In the preferred embodiment, one common dimension selected is bucket projection 68, or width across the top of the bucket 12, from front 14 to back 16 but could also be depth 22. Thus the preferred choice is not to be construed as limiting. Also, it will be seen that the buckets 12 belonging to a particular family 11 in the preferred embodiment have a common front depth 20, back depth 22 and thickness 24, though this should not be construed as limiting. The variable dimension within each family 11 is the lateral extent 26 or length 26 of the bucket 12, which variability in length 26 is easily accommodated by the method and apparatus 10 such that, in the exemplary families 11 defined in FIG. 3, the described thirty five bucket 12 embodiments, rather than requiring thirty five individual molds can be created with only seven mold base embodiments 30, as will be described in greater detail hereinbelow.

For the sake of brevity, only one mold base 30 embodiment will be described in detail, inasmuch as those skilled in the art will easily comprehend, without undue experimentation, how a mold base 30 for another family 11 of buckets 12 can be formed and used in the method from the following description of the one mold base 30.

As will be understood from a concurrent perusal of the remaining Figures, the mold base 30 comprises two mold portions, a bucket 12 exterior forming portion 40 and a bucket 12 interior forming portion 60.

Beginning with a perusal of the exterior forming portion 40, it will be seen to incorporate a cavity 42 therein which is configured to be larger than the largest desired bucket 12 configuration within one family 11 of buckets 12.

The cavity 42 incorporates an outer core 44 therein which extends into the cavity 42 toward the interior forming portion 60 a predetermined distance, which in the preferred embodiment terminates at a predetermined point which will eventually define a portion of an outer bottom surface 46 of any bucket 12 of the family 11. It will further be seen that the gate 48 through which a suitable material from which the buckets 12 are created extends downwardly through this core 44, emptying at a feed port 50 in a surface 52 which is oriented at the predetermined point of termination of the core 44.

A plurality of pairs 53 of inserts 54 are provided which engage within the cavity 42 and extend laterally from and about the core 44, each pair 53 of inserts 54 being of differing dimensions whereby each pair 53 of inserts 54 defines an outer surface configuration for a bucket 12 of a different lateral or widthwise extent, from a smallest desired lateral extent 26 to a largest desired lateral extent.

The exterior forming mold portion 40, it will be understood, must cooperate with the interior forming mold portion 60 to create a bucket 12 having a desired three dimensional configuration, as well as at least a desired wall thickness 24, and accommodating a desired front depth 20, back depth 22 and projection 68 for each family 11 of buckets 12, as well as accommodating a variable desired lateral extent 26 for each bucket 12 within a family 11.

Turning now to a perusal of the interior forming portion 60, it will also be seen to incorporate a cavity 70 therein which is configured to be of a predetermined smaller size than the cavity 42 in the exterior forming mold portion 40.

The cavity 70 also has core 72 therein having a central decreased in diameter elevated portion 74 having top surface 75 dimensions which substantially correspond to the dimensions of the surface 52 of the core 44 of the exterior forming portion 40, to which the top surface 75 thereof is subjacent and from which it is separated a predetermined distance of separation, substantially defining the wall thickness 24 of the bucket 12. The cavity 70 is actually an inward continuation of cavity 42 and cavity 42 is thus a common cavity 42, but is now defined by the open configuration of core 44 and inserts 54.

The interior forming mold portion 60 also has associated therewith a plurality of pairs 76 of inserts 78 which engage about and extend in a lateral extent from the core 72 a predetermined distance so as to cooperate with the pairs 53 of inserts 54 in the exterior forming portion 40 in such a manner as to be spaced from the inserts 54 of the exterior forming portion 40 by the same predetermined distance between the inner and outer cores 72 and 44, respectively, thus defining the thickness 24 of the buckets 12 by the dimension of the gap 80 between the cooperating exterior forming mold section 40 and the interior forming mold section 60.

Thus it will be understood that by use of corresponding pairs 53 and 76 of the plurality of available exterior or outer inserts 54 and interior or inner inserts 78 in a corresponding mold base 30, a plurality of buckets 12 having the same wall thickness 24, front depth 20, back depth 22 and projection 68 but having a different lateral extent 26 or dimension, defining members of one family 11 of buckets 12, can be created using a single mold base 30 rather than requiring a separate and distinct mold base 30 for each desired bucket 12 in a family 11 of buckets 12, as defined above.

Ease in reconfiguring the mold sections 40 and 60 is produced by the novel manner in which the inserts 54 and 78 are engaged to the mold base 30, eliminating the need to remove the mold base 30 from the apparatus 10 during the process of reconfiguration.

In this respect, it will be seen that bolts 94 are used to secure the plurality of inserts 54 and 78 to the mold base 30. The bolts 94 pass through each insert 54 and 78, and terminate within an opening 96 in the respective cooperating area of the mold base 30. The configuration of each opening 98 in each insert 54 and 78 is such that a head 100 of each bolt 94 is countersunk into an expanded are 102 of each opening 98 such that the head 100 of each bolt 94 does not interfere with required abutment of cooperating inserts 54 and 78 when the apparatus 10 is assembled for use.

Thus, the head 100 of each bolt 94 is readily accessible for changing of inserts 54 and 78 when the mold portions 40 and 60 are separated.

The method for using the apparatus 10 is relatively straightforward.

First, the family 11 to which a desired bucket 12 belongs is determined so that the appropriate mold base 30 is selected.

The desired lateral extent 26 for the bucket 12 is next determined and each appropriate pair 53 and 76 of cooperating inserts 54 and 78 is positioned within an appropriate cavity 42 and 70.

The interior forming mold section 60 and the exterior forming mold section 40 are next pressed together, in known manner, and the desired material from which the bucket 12 is to be created is fed in a melted condition, through the gate 48 in the core 44 of the exterior forming portion 40 and fills the gap 80. Cooling is next desired and water is fed through a water path system 82 positioned in locations most conducive to quick cooling, as is known in the art of injection molding.

After cooling, the sections 40 and 60 of the mold base 30 are separated and an ejector bar assembly 90 is used to release the cooled, formed bucket 12 from within the section 60, in known manner.

It will be clear to those skilled in the art that the method is repeated using the same mold base 30 for all members of a family 11 of buckets 12, while selecting and using a different mold base 30 when the dimensional configuration of a further bucket 12 to be made shows the desired bucket 12 to belong to a different family 11.

As described above the method and apparatus of the preferred invention provides a number of advantages, some of which have been described above and others of which are inherent in the invention.

Also, modifications may be proposed without departing from the teachings herein. Accordingly the scope of the invention is only to be limited as necessitated by the accompanying claims.

The invention claimed is:

1. An apparatus for use in creating a family of elevator bucket configurations, each family having at least one dimension in common; with each bucket configuration within each family having at least one dimension which varies from other bucket configurations within the family; the apparatus comprising a mold base having a bucket interior forming portion and a bucket exterior forming portion, the bucket exterior forming portion having a cavity therein configured to be larger than the largest desired bucket configuration within the family and having an outer core oriented therein which is configured to be smaller than the smallest desired bucket configuration within the family; the bucket interior forming portion having a cavity therein which is smaller than the cavity in the exterior forming portion and also having an interior core oriented therein which is configured to be smaller than the smallest desired bucket configuration within the family;

the outer core having one surface which aligns with an opposing surface of the inner core but being spaced a predetermined distance therefrom; the apparatus further including a plurality of pairs of outer surface inserts with each pair of inserts engaging about the outer core and extending along a height of the core to define an exterior surface of a bucket of a desired dimensional configuration, each pair of outer surface inserts being of differing dimensions corresponding to a particular desired outer configuration for one bucket of the family; and a plurality of pairs of inner surface inserts with each pair of inserts engaging about the inner core and extending along a height of the core to define an interior surface of a bucket of desired dimensional configuration, each pair of inner surface inserts being of differing dimension corresponding to a particular desired inner configuration for one bucket of the family, each inner surface insert having at least one surface which aligns with an opposing surface of a corresponding outer surface insert and being spaced a predetermined distance therefrom.

* * * * *